(12) United States Patent
Shimizu et al.

(10) Patent No.: US 9,707,957 B2
(45) Date of Patent: Jul. 18, 2017

(54) HYBRID VEHICLE

(71) Applicant: Toyota Jidosha Kabushiki Kaisha, Toyota-shi, Aichi-ken (JP)

(72) Inventors: Yu Shimizu, Nagakute (JP); Takashi Ando, Nisshin (JP); Takeshi Kishimoto, Nagakute (JP); Masaya Amano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/252,607

(22) Filed: Aug. 31, 2016

(65) Prior Publication Data
US 2017/0088125 A1 Mar. 30, 2017

(30) Foreign Application Priority Data
Sep. 25, 2015 (JP) .................................. 2015-188192

(51) Int. Cl.
| | |
|---|---|
| *B60W 20/50* | (2016.01) |
| *B60W 10/06* | (2006.01) |
| *B60W 10/08* | (2006.01) |
| *B60K 6/442* | (2007.10) |

(52) U.S. Cl.
CPC ............. *B60W 20/50* (2013.01); *B60K 6/442* (2013.01); *B60W 10/06* (2013.01); *B60W 10/08* (2013.01); *B60W 2510/087* (2013.01); *B60W 2710/0644* (2013.01); *B60W 2710/244* (2013.01); *B60W 2710/30* (2013.01); *Y10S 903/903* (2013.01); *Y10S 903/93* (2013.01)

(58) Field of Classification Search
CPC ...................................................... B60W 20/50
See application file for complete search history.

(56) References Cited

FOREIGN PATENT DOCUMENTS

| JP | 2013-203116 A | 10/2013 |
|---|---|---|
| JP | 2013203116 A * | 10/2013 |

* cited by examiner

*Primary Examiner* — John Walters
*Assistant Examiner* — James Triggs
(74) *Attorney, Agent, or Firm* — Dinsmore & Shohl LLP

(57) ABSTRACT

When a malfunction occurs in communication between an HV-ECU and an MG-ECU, inverterless running is performed to ensure that a driving torque of a vehicle is applied, by setting inverters in a gate shutoff state and using a braking torque generated in a motor generator rotated by an engine. When the inverterless running resulting from the malfunction in communication is performed, the MG-ECU uses a converter to control a system voltage VH to a predetermined voltage. During the inverterless running resulting from the malfunction in communication, the HV-ECU sets an assumed power range of a battery based on a detected value regarding a vehicle running state and the predetermined voltage. When an actual electric power determined from the voltage and current of the battery is out of the assumed power range, the HV-ECU performs a process for stopping the vehicle from running.

2 Claims, 9 Drawing Sheets

HYBRID VEHICLE

CROSS-REFERENCE TO RELATED APPLICATIONS

This nonprovisional application claims priority to Japanese Patent Application No. 2015-188192 filed on Sep. 25, 2015 with the Japan Patent Office, the entire contents of which are hereby incorporated by reference.

BACKGROUND

Field

The present disclosure relates to a hybrid vehicle, and more specifically to a fail-safe running of a hybrid vehicle including an internal combustion engine (engine) as well as a first motor generator and a second motor generator which are connected through a planetary gear device to the engine.

Description of the Background Art

A configuration in which an engine, a first motor generator, and a second motor generator are coupled by a planetary gear device is disclosed, as an example of the powertrain configuration of the hybrid vehicle, in Japanese Patent Laying-Open No. 2013-203116, for example. An electrical system of this hybrid vehicle is configured to include a converter capable of boosting an output voltage of a battery, and an inverter performing a bidirectional electric power conversion between the converter and the first and second motor generators.

According to Japanese Patent Laying-Open No. 2013-203116, when a malfunction of the inverter occurs, the hybrid vehicle runs in a fail-safe mode in which the inverter is kept in a gate shutoff state. Specifically, with each switching device of the inverter kept off, a rotational force of the engine mechanically (dynamically) rotates the first motor generator to cause a counter-electromotive voltage to be generated by the first motor generator. At this time, a braking torque is generated from the first motor generator and transmitted through the planetary gear device to act on an output shaft (a ring gear of the planetary gear device) in a forward direction (advance). In this way, a driving torque for the vehicle to run in the fail-safe mode is ensured.

SUMMARY

The fail-safe running with the inverter kept in the gate shutoff state (hereinafter also referred to as "inverterless running") as disclosed in Japanese Patent Laying-Open No. 2013-203116 is also applicable to a vehicle in which a malfunction occurs in communication between a controller for the inverter and another controller, even when there occurs no malfunction of the first and second motor generator.

For example, a vehicle in which a first controller controlling the engine and a second controller controlling the first and second motor generators are formed by separate ECUs (Electronic Control Units) is able to start inverterless running, upon detection of a malfunction in communication between the first controller and the second controller. As disclosed in Japanese Patent Laying-Open No. 2013-203116, during the inverterless running, the first controller controls the engine speed to adjust the driving torque of the vehicle.

As disclosed in Japanese Patent Laying-Open No. 2013-203116, the braking torque of the first motor generator during the inverterless running is varied depending on a voltage difference between the counter-electromotive voltage which is proportional to the rotational speed and a converter output voltage. Namely, even when the engine rotational speed enables the first motor generator to be controlled to operate at a target rotational speed, the driving torque may become insufficient or excessive if the converter output voltage is not controlled as assumed.

However, when the inverterless running is started in response to a malfunction in communication between the first and second controllers, it is impossible for the first controller to acquire the converter output voltage from the second controller. Therefore, the first controller is unable to recognize abnormality of the driving torque due to lack of proper control of the converter output voltage. Thus, there is a possibility that even when an abnormal torque is generated, the engine rotational speed control for the inverterless running is still continued.

Some embodiments described herein stop the vehicle from running upon detection of abnormality of the driving torque during inverterless running of the hybrid vehicle resulting from a malfunction in communication between the controllers.

According to an aspect of the present disclosure, a hybrid vehicle includes: an engine; a first rotating electric machine including a first rotor equipped with a permanent magnet; an output shaft coupled to drive wheels; a second rotating electric machine; and a planetary gear device. The planetary gear device is mechanically coupled to the engine, the first rotor, and the output shaft, and configured to transmit a torque between the first rotating electric machine, the engine, and the output shaft. The second rotating electric machine includes a second rotor coupled to the output shaft. The vehicle further includes: a power storage device configured to be rechargeable; a monitoring unit; a converter; a first inverter and a second inverter; and a first controller and a second controller. The monitoring unit is configured to detect a voltage and a current of the power storage device. The converter is configured to perform a bidirectional DC voltage conversion between the power storage device and an electric power line. The first inverter is connected between the electric power line and the first rotating electric machine. The second inverter is connected between the electric power line and the second rotating electric machine. The first controller is configured to control an operation of the engine. The second controller is configured to control the first rotating electric machine and the second rotating electric machine through the first inverter and the second inverter, and to control a voltage on the electric power line through the converter. The hybrid vehicle includes a fail-safe running mode to perform inverterless running. In the inverterless running, each of the first inverter and the second inverter is set in a gate shutoff state, the engine is controlled to mechanically rotate the first rotating electric machine with a braking torque generated by electric power generation, and the hybrid vehicle is caused to run by a torque acting on the output shaft as a counterforce of the braking torque. In each of the first inverter and the second inverter in the gate shutoff state, each switching element is kept in an OFF state and a diode connected in anti-parallel with the switching element forms a current path. When detecting a malfunction in communication with the second controller, the first controller controls a rotational speed of the engine so that the inverterless running is performed. When detecting a malfunction in communication with the first controller, the second controller sets each of the first inverter and the second inverter in the gate shutoff state and controls an operation of the converter to control the voltage on the electric power line so that the voltage is equal to a predetermined first voltage, so as to cause the inverterless running to be performed. The first controller stops the hybrid vehicle from running when an actual electric power calculated from the voltage and the current of the power storage device is out of an assumed electric power range which is set based on a detected value regarding a running state of the hybrid vehicle and the first voltage, during the inverterless running.

For example, the assumed electric power range is set as an electric power range including a predicted input-output electric power of the power storage device. The predicted input-output electric power is determined from the first voltage, a detected value of the rotational speed of the engine, a rotational speed of the second rotating electric machine converted from a detected value of a vehicle speed, and a gear ratio of the planetary gear device.

Regarding the above-described vehicle, during inverterless running resulting from a malfunction in communication between the first and second controllers, an assumed electric power range while the second controller is capable of controlling the voltage of the electric power line (system voltage VH) to be the first voltage is set based on the vehicle running state. When the actual power of the power storage device becomes out of the assumed electric power range, abnormality of the driving torque can be detected to stop the vehicle from running. As a result of this, during the inverterless running resulting from a malfunction in communication between the first and second controllers, the first controller can detect indirectly detect abnormality of the driving torque by monitoring the actual power of the power storage device, without receiving from the second controller information about the voltage of the electric power line (system voltage VH).

Some embodiments described herein stop the vehicle from running upon detection of abnormality of the driving torque during inverterless running of a hybrid vehicle caused by a malfunction in communication between controllers.

The foregoing and other features, aspects and advantages of the embodiments described herein will become more apparent from the following detailed description when taken in conjunction with the accompanying drawings.

DETAILED DESCRIPTION

Figure 1:
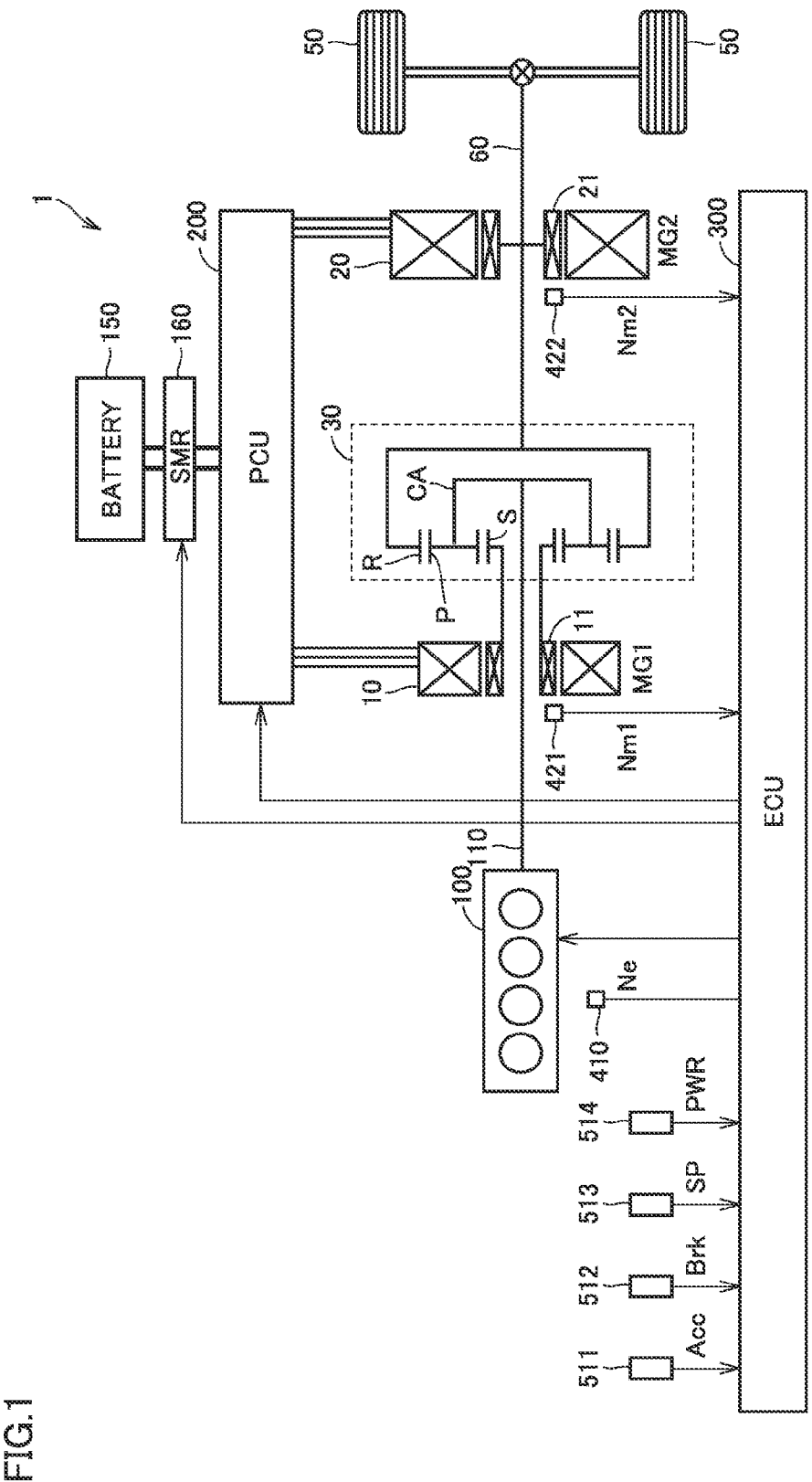
FIG. 1 is a block diagram schematically showing an overall configuration of a hybrid vehicle according to one or more embodiments.

Hereinafter, embodiments will be described in detail with reference to the drawings. It should be noted that the same or equivalent elements in the drawings are denoted by the same reference characters, and the description thereof will not be repeated.

<Overall Configuration of Vehicle>

FIG. 1 is a block diagram schematically showing an overall configuration of a hybrid vehicle.

Referring to FIG. 1, vehicle 1 includes an engine 100, a motor generator 10, a motor generator 20, a planetary gear device 30, drive wheels 50, an output shaft 60 coupled to drive wheels 50, a battery 150 constituting "power storage device," a system main relay (SMR) 160, a power control unit (PCU) 200, and an electronic control unit (ECU) 300.

Vehicle 1 runs by using at least one of the motive power from engine 100 and the motive power from motor generator 20. In a normal running mode which will be described later herein, vehicle 1 is capable of switching the running mode between an electric vehicle running (EV running) mode in which the vehicle uses the motive power from motor generator 20 without using the motive power from engine 100 and a hybrid vehicle running (HV running) mode in which the vehicle uses both the motive power from engine 100 and the motive power from motor generator 20.

Engine 100 is an internal combustion engine such as gasoline engine or diesel engine. Engine 100 is configured to generate the motive power for vehicle 1 to run in accordance with a control signal from ECU 300. The motive power generated by engine 100 is output to planetary gear device 30.

Engine 100 is equipped with an engine rotational speed sensor 410. Engine rotational speed sensor 410 is configured to detect a rotational speed (engine rotational speed) Ne of engine 100, and output a signal representing the detection result to ECU 300.

Each of motor generators 10 and 20 is a three-phase AC permanent magnet synchronous motor, for example. When starting engine 100, motor generator (first motor generator: MG1) 10 rotates a crankshaft 110 of engine 100 by using the electric power from battery 150. Motor generator 10 is also capable of generating electric power by using the motive power from engine 100. AC power generated by motor generator 10 is converted into DC power by PCU 200 to charge battery 150. The AC power generated by motor generator 10 may also be supplied to motor generator 20. Motor generator 10 corresponds to "first rotating electric machine" and motor generator 20 corresponds to "second rotating electric machine."

A rotor 21 of motor generator (second motor generator: MG2) 20 is mechanically coupled to output shaft 60. Motor generator 20 rotates output shaft 60 by using at least one of the electric power supplied from battery 150 and the electric power generated by motor generator 10. Motor generator 20 is also capable of generating electric power through regenerative braking. AC power generated by motor generator 20 is converted into DC power by PCU 200 to charge battery 150. It should be noted that while the rotor of motor generator 20 is directly coupled to output shaft 60 in the example shown in FIG. 1, the rotor may be mechanically coupled to output shaft 60 through a transmission (reduction gear).

Motor generator 10 is equipped with a resolver 421. Resolver 421 is configured to detect a rotational speed (MG1 rotational speed) Nm1 of motor generator 10, and output a signal representing the detection result to ECU 300. Similarly, motor generator 20 is equipped with a resolver 422. Resolver 422 is configured to detect a rotational speed (MG2 rotational speed) Nm2 of motor generator 20, and output a signal representing the detection result to ECU 300.

Planetary gear device 30 is configured to mechanically couple engine 100, motor generator 10, and output shaft 60, and to be capable of transmitting torque between engine 100, motor generator 10, and output shaft 60. Specifically, planetary gear device 30 includes, as rotational elements, a sun gear S, a ring gear R, a carrier CA, and a pinion gear P. Sun gear S is coupled to a rotor 11 of motor generator 10. Ring gear R is coupled to output shaft 60. Pinion gear P meshes with sun gear S and ring gear R. Carrier CA is coupled to crankshaft 110 of engine 100, and holds pinion gear P in such a manner that pinion gear P is capable of both rotating and revolving.

Battery 150 is presented as an example of "power storage device" configured to be rechargeable. Typically, battery 150 is configured as a secondary battery such as nickel-metal hydride secondary battery or lithium ion secondary battery. As the power storage device, a capacitor such as electric double-layer capacitor may also be used. The voltage VB of battery 150 (hereinafter also referred to as "battery voltage") is approximately 200 V, for example.

SMR 160 is connected to an electric power line between battery 150 and PCU 200. SMR 160 is configured to switch between an electrically conductive state (ON) in which battery 150 and PCU 200 are electrically conductive to each other and a shutoff state (OFF) in which battery 150 and PCU 200 are shut off from each other, in accordance with a control signal from ECU 300.

PCU 200 boosts the voltage of DC power stored in battery 150, converts the boosted voltage into an AC voltage, and supplies the AC voltage to motor generator 10 and motor generator 20. Further, PCU 200 converts AC power generated by motor generator 10 and motor generator 20 into DC power and supplies the DC power to battery 150. The configuration of PCU 200 will be described in detail with reference to FIG. 2. Vehicle 1 further includes an accelerator pedal sensor 511, a brake pedal sensor 512, a vehicle speed sensor 513, and a power switch 514. Accelerator pedal sensor 511 is configured to detect an operation amount Acc by which a driver operates an accelerator pedal (not shown). When the accelerator pedal is not operated, Acc is equal to zero, Acc=0. Brake pedal sensor 512 detects an operation amount Brk by which a driver operates a brake pedal (not shown). Vehicle speed sensor 513 detects the speed of vehicle 1, namely vehicle speed SP. Respective values detected by accelerator pedal sensor 511, brake pedal sensor 512, and vehicle speed sensor 513 are input to ECU 300. Vehicle speed SP is proportional to the rotational speed of output shaft 60. Therefore, a proportional relation defined by a proportionality constant is held between MG2 rotational speed Nm2 and vehicle speed SP.

Power switch 514 is operated by a driver to instruct the vehicle to start or stop operating. Operation of power switch 514 by a user causes signal PWR to be input to ECU 300. Thus, based on signal PWR, ECU 300 can detect that power switch 514 has been operated.

For example, when a driver operates power switch 514 while depressing the brake pedal in an operation-stop state in which the vehicle's operation is stopped, ECU 300 sets vehicle 1 in "Ready-ON state." In the Ready-ON state, SMR 160 is turned on to cause battery 150 and PCU 200 to be electrically conductive. Then, vehicle 1 is set in a state in which vehicle 1 is able to run in accordance with operation of the accelerator pedal.

In contrast, when a driver operates power switch 514 in the Ready-ON state, vehicle 1 is shifted to the operation-stop state (Ready-OFF state). In the Ready-OFF state, SMR 160 is turned off to electrically shut off battery 150 and PCU 200 from each other. Then, vehicle 1 is set in a state in which vehicle 1 is unable to run.

ECU 300 is configured to include a central processing unit (CPU), a memory, an input/output buffer, and the like (they are not shown). ECU 300 controls various devices such that vehicle 1 runs in a desired running state, in accordance with a signal from each of the sensors and instruments as well as a map and a program stored in the memory. It should be noted that various kinds of control are not limited to be processed by software, and rather may be processed by dedicated hardware (electronic circuitry). Although ECU 300 is shown in FIG. 1 as a single element, ECU 300 is actually multiple ECUs distributed in the vehicle. Details will be described with reference to FIG. 2.

<Configuration of Electrical System and ECU>

Figure 2:
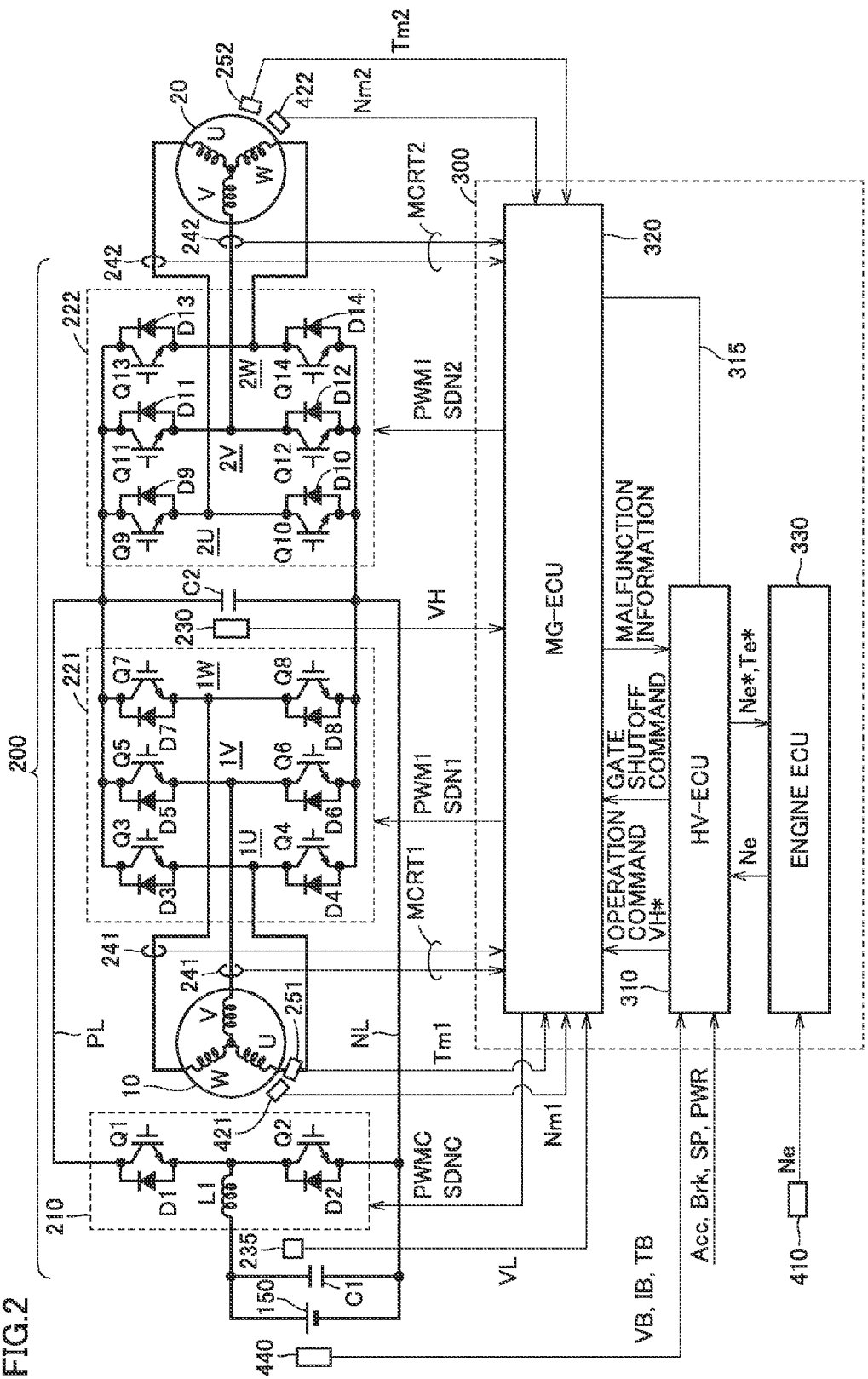
FIG. 2 is a circuit block diagram for illustrating a configuration of an electrical system and ECUs of the hybrid vehicle shown in FIG. 1.

FIG. 2 is a circuit block diagram for illustrating a configuration of an electrical system and ECU 300 of vehicle 1. Referring to FIGS. 1 and 2, PCU 200 includes a capacitor C1, a converter 210, a capacitor C2, inverters 221 and 222, a voltage sensor 230, and current sensors 241 and 242. ECU 300 includes an HV-ECU 310, an MG-ECU 320, and an engine ECU 330.

Battery 150 is equipped with a monitor unit 440. Monitor unit 440 is configured to detect battery voltage VB, input/output current IB of battery 150, and the temperature of battery 150, and output signals representing respective results of detection to HV-ECU 310.

Capacitor C1 is connected in parallel with battery 150. Capacitor C1 smoothes battery voltage VB and supplies the smoothed voltage to converter 210. It should be noted that capacitor C1 is disposed closer to converter 210 than SMR 160 shown in FIG. 1 is. Therefore, when SMR 160 is turned off, capacitor C1 is disconnected from battery 150.

Converter 210 is configured to boost battery voltage VB in response to a control signal from MG-ECU 320, and supply the boosted voltage to electric power lines PL and NL. Converter 210 is also configured to step down a DC voltage of electric power lines PL and NL supplied from one of or both inverters 221 and 222 in response to a control signal from MG-ECU 320 so as to charge battery 150. In this way, converter 210 performs a bidirectional DC voltage conversion between battery 150 and electric power lines PL and NL.

More specifically, converter 210 is configured as a so-called boost chopper and includes a reactor L1, switching elements Q1 and Q2, and diodes D1 and D2. Each of switching elements Q1 and Q2 and switching elements Q3 to Q14 which will be described later herein is for example an IGBT (insulated gate bipolar transistor). Switching elements Q1 and Q2 are connected in series between electric power line PL and electric power line NL. Diode D1 is connected in anti-parallel to switching element Q1, and diode D2 is connected in anti-parallel to switching element Q2.

Capacitor C2 is connected between electric power line PL and electric power line NL. Capacitor C2 is configured to smooth a DC voltage supplied from converter 210 and supply the smoothed voltage to inverters 221 and 222.

Voltage sensor 230 is configured to detect a voltage across capacitor C2, namely a voltage (hereinafter also referred to as "system voltage") VH between electric power lines PL and NL which connect converter 210 and inverter 221, and output a signal representing the detection result to MG-ECU 320. Voltage sensor 235 is also configured to detect a voltage VL across capacitor C1, and output a signal representing the detection result to MG-ECU 320.

Upon receiving the supplied system voltage VH, inverter 221 converts the DC voltage into an AC voltage in response to a control signal from MG-ECU 320 so as to drive motor generator 10. Thus, motor generator 10 is driven to generate a torque in accordance with a torque command value.

Inverter 221 includes a U-phase arm 1U, a V-phase arm 1V, and a W-phase arm 1W. These phase arms are connected in parallel to each other between electric power line PL and electric power line NL. U-phase arm 1U includes switching element Q3 and switching element Q4 which are connected in series to each other. V-phase arm 1V includes switching element Q5 and switching element Q6 which are connected in series to each other. W-phase arm 1W includes switching element Q7 and switching element Q8 which are connected in series to each other. Diodes D3 to D8 are connected in anti-parallel with switching elements Q3 to Q8, respectively.

An intermediate point of each phase arm is connected to a corresponding phase coil of motor generator 10. Namely, one end of the U-phase coil, one end of the V-phase coil, and one end of the W-phase coil are commonly connected to a neutral point. The other end of the U-phase coil is connected to the intermediate point between switching elements Q3 and Q4. The other end of the V-phase coil is connected to the intermediate point between switching elements Q5 and Q6. The other end of the W-phase coil is connected to the intermediate point between switching elements Q7 and Q8.

Inverter 222 includes phase arms 2U to 2W, switching elements Q9 to Q14, and diodes D9 to D14. Since the configuration of inverter 222 is substantially equivalent to that of inverter 221, the description thereof will not be repeated.

Motor generator 10 is equipped with resolver 421, current sensor 241, and a temperature sensor 251. Motor generator 20 is equipped with resolver 422, current sensor 242, and a temperature sensor 252. Resolver 421 is configured to detect a rotational speed (MG1 rotational speed Nm1) of motor generator 10. Resolver 422 is configured to detect a rotational speed (MG2 rotational speed Nm2) of motor generator 20. Current sensor 241 is configured to detect current (motor current MCRT1) flowing through motor generator 10. Current sensor 242 is configured to detect current (motor current MCRT2) flowing through motor generator 20. Temperature sensor 251 is configured to detect a temperature (motor temperature Tm1) of motor generator 10. Temperature sensor 252 is configured to detect a temperature (motor temperature Tm2) of motor generator 20. These sensors each output a signal representing the detection result to MG-ECU 320.

As described above, ECU 300 includes HV-ECU 310, MG-ECU 320, and engine ECU 330 which are capable of communicating with each other.

HV-ECU 310 communicates with MG-ECU 320 to control motor generators 10 and 20 and also communicates with engine ECU 330 to control engine 100. HV-ECU 310 thus performs centralized control of the entire vehicle 1 so that vehicle 1 runs in accordance with driver's operation.

Specifically, based on accelerator operation amount Acc, brake operation amount Brk, and vehicle speed SP, HV-ECU 310 calculates a driving torque necessary for the vehicle to run. HV-ECU 310 further determines an optimum output assigned to engine 100 and respective optimum outputs assigned to motor generators 10 and 20 for allowing the driving torque to act on output shaft 60, and generates an operation command for motor generators 10 and 20 and an operation command for engine 100 in accordance with the respective assigned outputs as determined.

The operation command for engine 100 is output from HV-ECU 310 to engine ECU 330. The operation command for engine 100 includes a target engine rotational speed Ne* and a target engine torque Te*. Based on an output from engine rotational speed sensor 410 for example, engine ECU 330 monitors the state of engine 100, and controls a group of actuators (fuel injection valve, ignition plug, intake valve, exhaust valve, and the like) of engine 100 so as to control the output of engine 100 based on the operation command from HV-ECU 310.

Specifically, engine ECU 330 controls the fuel injection, the ignition timing, and the valve timing for example of engine 100 so that engine 100 operates following the operation command (target engine rotational speed Ne* and target engine torque Te*) for engine 100 determined by HV-ECU 310. Further, engine ECU 330 receives engine rotational speed Ne from engine rotational speed sensor 410 and outputs the value of the rotational speed to HV-ECU 310. Thus, HV-ECU 310 can acquire engine rotational speed Ne.

In this way, engine 100 is controlled by HV-ECU 310 which generates the operation command and engine ECU 300 which controls the group of actuators of engine 100 in accordance with the operation command. Namely, in the example shown in FIG. 2, HV-ECU 310 and engine ECU 330 constitute "first controller." It should be noted that while HV-ECU 310 and engine ECU 330 in the example shown in FIG. 2 are configured as separate ECUs, the functions of engine ECU 330 may be merged into HV-ECU 310 to implement these ECUs as a single ECU.

Meanwhile, motor generators 10 and 20 are controlled by MG-ECU 320. MG-ECU 320 corresponds to "second controller." The operation command for motor generators 10 and 20 is output from HV-ECU 310 to MG-ECU 320. The operation command for motor generators 10 and 20 includes an operation permitting command for each of motor generators 10 and 20, an operation prohibiting command for each of motor generators 10 and 20 (gate shutoff commands for inverters 221 and 222), torque command value TR1 for motor generator 10, and torque command value TR2 for motor generator 20, for example.

Further, HV-ECU 310 sets a target value VH* of the output voltage of converter 210 (hereinafter referred to as "target system voltage"), and outputs the set target value to MG-ECU 320. Based on respective outputs from resolvers 421 and 422, current sensors 241 and 242, and temperature sensors 251 and 252, for example, MG-ECU 320 monitors the state (rotational speed, current, temperature, for example) of motor generators 10 and 20, and controls converter 210 and inverters 221 and 222 based on a command signal from HV-ECU 310 to thereby control the output of motor generators 10 and 20.

Specifically, upon receiving target system voltage VH* from HV-ECU 310, MG-ECU 320 controls turn-on and turn-off of switching elements Q1 and Q2 of converter 210 so that system voltage VH follows target system voltage VH*. For example, under PWM (Pulse Width Modulation) control, control signal PWMC for controlling turn-on and turn-off of switching elements Q1 and Q2 is generated.

In contrast, upon receiving, from HV-ECU 310, a gate shutoff command for converter 210, MG-ECU 320 generates gate shutoff signal SDNC for setting each of switching elements Q1 and Q2 in a gate shutoff state, and outputs the generated signal to converter 210.

It should be noted that a signal line 315 is further provided between HV-ECU 310 and MG-ECU 320 separately from the paths for communication between the ECUs, for directly transmitting a shutdown command signal for the electrical system (FIG. 2). Accordingly, even when communication of information (data) between HV-ECU 310 and MG-ECU 320 becomes impossible due to a malfunction in communication, the path for transmitting the shutdown command signal from HV-ECU 310 to MG-ECU 320 can still be ensured, as will be described later herein.

MG-ECU 320 also controls inverters 221 and 222 so that motor generators 10 and 20 operate in accordance with an operation command received from HV-ECU 310. Since control of inverter 221 and control of inverter 222 are substantially identical to each other, the control of inverter 221 will be described as exemplary control.

Upon receiving an operation permitting command for motor generator 10 from HV-ECU 310, MG-ECU 320 generates, based on system voltage VH, motor current MCRT1, and torque command value TR1, a PWM control signal PWM1 so as to cause each of switching elements Q3 to Q8 to perform switching operation, and outputs the signal to inverter 221. In contrast, upon receiving a gate shutoff command for inverter 221 from HV-ECU 310, MG-ECU 320 generates a gate shutoff signal SDN1 for setting each of switching elements Q3 to Q8 in a gate shutoff state, and outputs the signal to inverter 221.

<Normal Running and Inverterless Running>

ECU 300 is capable of causing vehicle 1 to run in a control mode which is one of a normal running mode and a fail-safe running mode.

In the normal running mode, vehicle 1 runs in any of the aforementioned EV running mode and HV running mode which are switched to each other as required. In other words, the normal running mode is a mode permitting motor generators 10 and 20 to be electrically driven by inverters 221 and 222. In the following, running in the normal running mode is referred to as "normal running."

In contrast, the fail-safe running mode is applied when such a malfunction occurs that makes it impossible for inverters 221 and 222 to electrically drive motor generators 10 and 20 in a normal manner. In the fail-safe running mode, vehicle 1 runs in a similar inverterless running mode to that disclosed in Japanese Patent Laying-Open No. 2013-203116. Typically, when the parts such as current sensors 241 and 242 that are necessary for control by inverters 221 and 222 fail, information about this abnormality is transmitted from MG-ECU 320 to HV-ECU 310. In response to this, the normal mode is shifted to the fail-safe mode and the gate shutoff command is output from HV-ECU 310 to MG-ECU 320. Accordingly, the inverterless running is applied.

Figure 3:
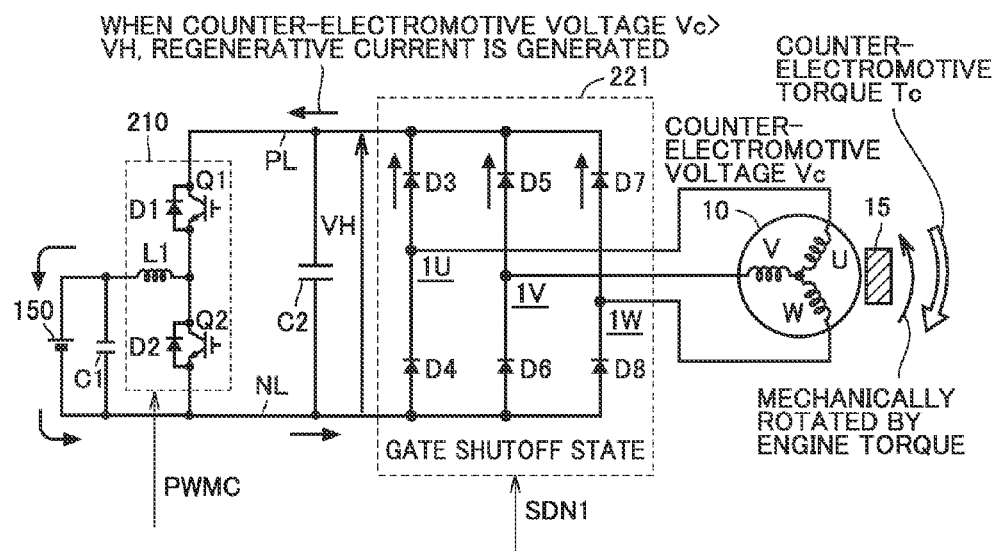
FIG. 3 is a circuit diagram schematically showing a state of the electrical system during inverterless running.

FIG. 3 is a diagram schematically showing a state of the electrical system during inverterless running.

Referring to FIG. 3, for inverterless running, inverters 221 and 222 are set in the gate shutoff state in response to gate shutoff signals SDN1 and SDN2 from MG-ECU 320. Accordingly, switching elements Q3 to Q8 of inverter 221 and switching elements Q9 to Q14 of inverter 222 (FIG. 2) are turned off. In the gate shutoff state, only a current path is formed by conduction of diodes D3 to D8 in inverter 221. Accordingly, a three-phase full-wave rectifier circuit is formed in inverter 221. Likewise, a three-phase full-wave rectifier circuit is also formed by diodes D9 to D14 in inverter 222.

Even during the inverterless running, converter 210 is able to control turn-on and turn-off of switching elements Q1 and Q2 in response to control signal PWMC from MG-ECU 320. Namely, even during the inverterless running, system voltage VH can be controlled in accordance with target system voltage VH*.

During the inverterless running, engine 100 is driven to output engine torque Te. This engine torque Te causes motor generator 10 to be dynamically (mechanically) driven. Rotor 11 (FIG. 1) of motor generator 10 configured as a three-phase AC permanent magnet synchronous motor includes a permanent magnet 15.

Therefore, when rotor 11 of motor generator 10 is rotated by engine torque Te, a magnetic-field change due to rotation of permanent magnet 15 causes counter-electromotive voltage Vc to be generated in motor generator 10. When this counter-electromotive voltage Vc exceeds system voltage VH, regenerative current flows from motor generator 10 toward battery 150. At this time, counter-electromotive torque Tc (braking torque) acting to impede rotation of motor generator 10 is generated in motor generator 10.

Counter-electromotive voltage Vc corresponds to a DC voltage generated by AC-to-DC conversion of an induced voltage (AC), which is generated in each phase of motor generator 10 by rotation of permanent magnet 15, by the three-phase full-wave rectifier circuit formed by diodes D3 to D8 of inverter 221. Namely, counter-electromotive voltage Vc is output from inverter 221 to electric power line PL.

Figure 4:
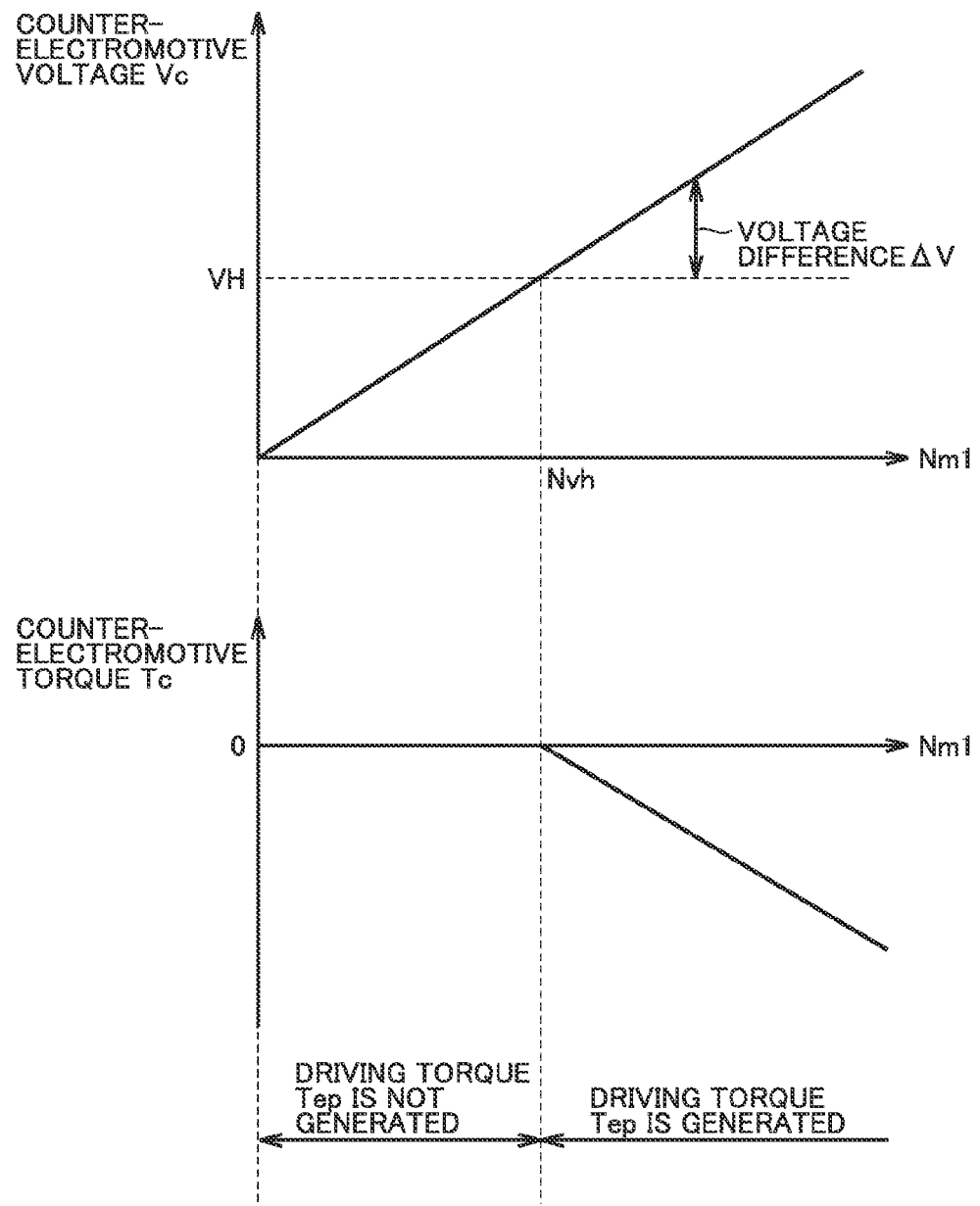
FIG. 4 is a conceptual diagram illustrating a condition under which a driving torque is generated during inverterless running.

FIG. 4 is a conceptual diagram for illustrating a condition under which a driving torque is generated during inverterless running. FIG. 4 shows characteristics of counter-electromotive voltage Vc and counter-electromotive torque Tc in motor generator 10, with respect to MG1 rotational speed Nm1.

The horizontal axis in FIG. 4 represents MG1 rotational speed Nm1. The vertical axis of the upper chart in FIG. 4 represents counter-electromotive voltage Vc, and the vertical axis of the lower chart in FIG. 4 represents counter-electromotive torque Tc.

As shown in FIG. 4, counter-electromotive voltage Vc increases with MG1 rotational speed Nm1. Nvh is defined here as Nm1 at which counter-electromotive voltage Vc is comparable to system voltage VH. Then, in the region meeting Nm1≤Nvh, Vc≤VH holds, and therefore, no current flows from motor generator 10 toward battery 150. Because of this, no counter-electromotive torque Tc is generated as well (Tc=0).

In contrast, in the region meeting Nm1>Nvh, Vc>VH holds, and therefore, current flows from motor generator 10 toward battery 150. At this time, in motor generator 10, counter-electromotive torque Tc which is a negative torque is generated. The absolute value of counter-electromotive torque Tc depends on a voltage difference ΔV between counter-electromotive voltage Vc and system voltage VH (ΔV=Vc−VH). As seen from the above, the region meeting Vc>VH is a region allowing counter-electromotive torque Tc to be generated, namely a region enabling the inverterless running.

Figure 5:
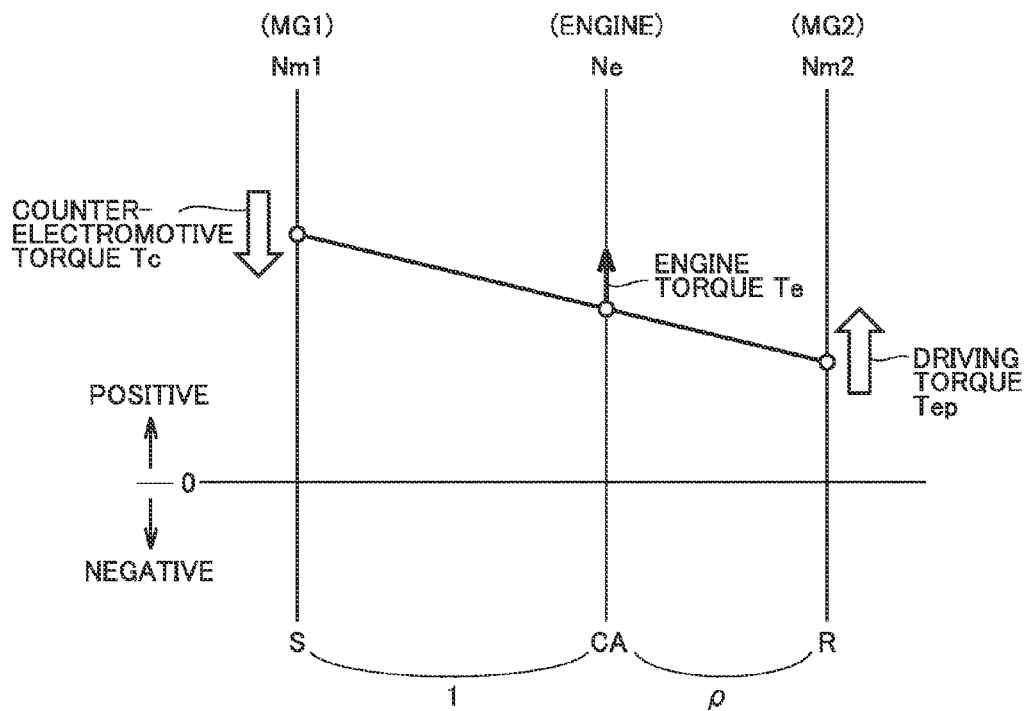
FIG. 5 is a nomographic chart for a planetary gear device during inverterless running.

FIG. 5 is a nomographic chart for illustrating a behavior of each rotational element of the planetary gear device during inverterless running.

Referring to FIG. 5, since planetary gear device 30 is configured as illustrated in FIG. 1, the rotational speed of sun gear S (=MG1 rotational speed Nm1), the rotational speed of carrier CA (=engine rotational speed Ne), and the rotational speed of ring gear R (=MG2 rotational speed Nm2) have a relation defined by a straight line connecting these rotational speeds on the nomographic chart.

During inverterless running, engine torque Te is output from engine 100. Engine torque Te dynamically rotates motor generator 10 to cause motor generator 10 to generate counter-electromotive voltage Vc. As shown in FIG. 4, when counter-electromotive voltage Vc exceeds system voltage VH, motor generator 10 generates counter-electromotive torque Tc acting in a direction (negative direction) of impeding rotation of motor generator 10.

Counter-electromotive torque Tc generated from motor generator 10 acts on sun gear S. Then, driving torque Tep acting in the forward direction (advance direction) is generated on ring gear R as a counterforce against counter-electromotive torque Tc. Driving torque Tep is represented by Tep=-Tc/ρ where ρ is the gear ratio of planetary gear device 30 shown in FIG. 5. It is understood that since counter-electromotive torque Tc which is a braking torque meets Tc<0, Tep>0 (advance direction) holds.

This driving torque Tep enables inverterless running of vehicle 1. Thus, during the inverterless running, motor generators 10 and 20 are rotating.

Figure 6:
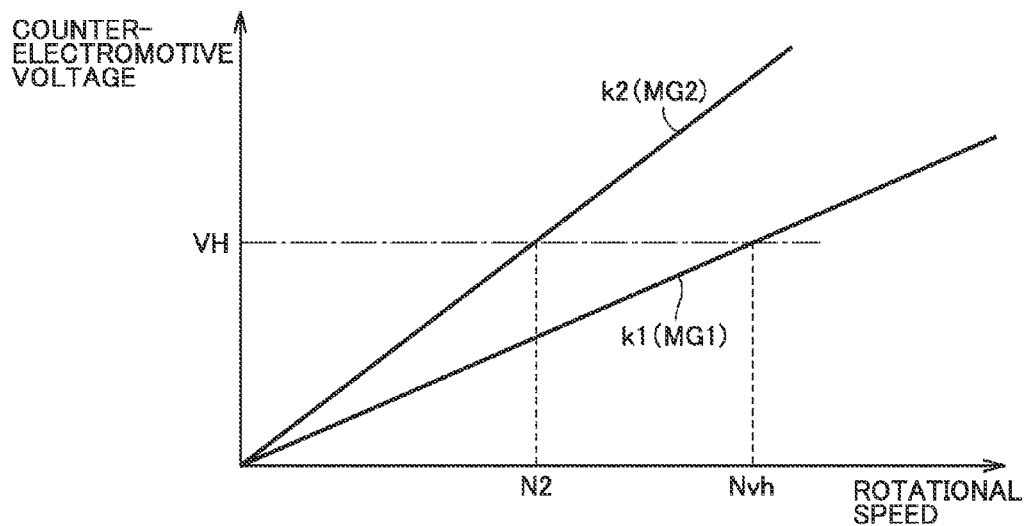
FIG. 6 is a conceptual diagram illustrating characteristics of a counter-electromotive voltage of a motor generator.

FIG. 6 shows a graph illustrating a relation between the rotational speed and the counter-electromotive voltage of the motor generator.

Referring to FIG. 6, a straight line k1 represents a relation between the rotational speed and the counter-electromotive voltage of motor generator 10. Likewise, a straight line k2 represents a relation between the rotational speed and the counter-electromotive voltage of motor generator 20. In the following, the counter-electromotive voltage generated in motor generator 20 is indicated by Vm to be distinguished from counter-electromotive voltage Vc generated in motor generator 10 (FIG. 4).

In motor generators 10 and 20, counter-electromotive voltages Vc and Vm which are proportional to respective rotational speeds of the motor generators are generated, respectively. Counter-electromotive voltage Vc of motor generator 10 is represented by Vc=Kc·|Nm1|, and counter-electromotive voltage Vm of motor generator 20 is represented by Vm=Km·|Nm2|, where Kc and Km are respective proportionality constants of motor generators 10 and 20.

It should be noted that proportionality constants Kc and Km are determined in accordance with the counter-electromotive voltage characteristics of motor generators 10 and 20. By way of example, FIG. 6 shows that proportionality constant Km of motor generator 20 is larger than proportionality constant Kc of motor generator 10. These proportionality constants can be acquired in advance to calculate respective counter-electromotive voltages Vc and Vm generated in motor generators 10 and 20, based on rotational speeds Nm1 and Nm2 of motor generators 10 and 20.

As shown in FIG. 6, when motor generator 10 satisfies rotational speed Nm1=criterion value Nvh, counter-electromotive voltage Vc is equal to DC voltage (system voltage) VH of inverter 221. Therefore, criterion value Nvh for counter-electromotive voltage Tc to be generated can be inversely calculated from the detection value of system voltage VH. It should be noted that system voltage VH can be controlled by converter 210 even during the inverterless running.

Meanwhile, in motor generator 20 as well, the counter-electromotive torque is generated for the region meeting rotational speed Nm2>N2. It should be noted that, as understood from FIG. 5, the counter-electromotive torque of motor generator 20 acts in the backward direction of vehicle 1. Namely, when the counter-electromotive torque is generated in motor generator 20, driving torque Tep caused by counter-electromotive torque Tc is decreased.

As understood from the foregoing, during the inverterless running, HV-ECU 310 controls rotational speed Nm1 of motor generator 10 in accordance with accelerator operation amount Acc, to thereby enable driving torque Tep to act on output shaft 60 in accordance with accelerator operation amount Acc.

For example, when Acc=0 holds, control is necessary so as not to cause counter-electromotive voltage Vc generated in motor generator 10 to exceed system voltage VH (Vc≤VH). At this time, it is necessary to control rotational speed Nm1 of motor generator 10 so that rotational speed Nm1 falls in the range defined by the following formula (1).

$$-VH/Kc \leq Nm1 \leq VH/Kc \qquad (1)$$

Meanwhile, as shown in FIG. 5, engine rotational speed Ne, rotational speed Nm1 of motor generator 10, and rotational speed Nm2 of motor generator 20 have a relation defined by the following formula (2) with p which is the gear ratio of planetary gear device 30.

$$Ne=Nm1 \times \rho/(1+\rho)+Nm2/(1+\rho) \qquad (2)$$

The relation defined by the formula (2) can be used to transform the aforementioned formula (1) to define a control range of engine rotational speed Ne as shown by the following formulas (3) and (4):

$$-Ne1 \leq Ne \leq Ne1 \qquad (3),$$

$$\text{where } Ne1=(VH/Kc) \times \rho/(1+\rho)+Nm2/(1+\rho) \qquad (4).$$

Therefore, when the accelerator is released (Acc=0), HV-ECU 310 sets target engine rotational speed Ne* so that the engine rotational speed falls in the control range (−Ne1 to Ne1) defined by the above formula (3). It should be noted that rotational speed Nm2 required for calculation of Ne1 in formula (1) can be derived from the detection value of resolver 422 and can also be calculated from vehicle speed SP detected by vehicle speed sensor 513.

In contrast, when the accelerator is operated (Acc>0), HV-ECU 310 ensures that driving torque Tep is applied, by making engine rotational speed Ne higher than Ne1 of formula (4). In order to make the magnitude of driving torque Tep variable depending on accelerator operation amount Acc, target engine speed Ne* can be set to be variable depending on accelerator operation amount Acc. Specifically, HV-ECU 310 is capable of setting target engine rotational speed Ne* during the inverterless running, in accordance with the following formula (5).

$$Ne^*=Ne1+\Delta Ne \qquad (5)$$

It should be noted that the rotational speed increase ΔNe in formula (5) may be a value determined by multiplying accelerator operation amount Acc by a predetermined factor α (α>0) (ΔNe=α·Acc).

It should be noted that when the rotational speed of output shaft 60, namely the vehicle speed is increased in response to driving torque Tep applied in accordance with accelerator operation amount Acc, counter-electromotive voltage Vm of motor generator 200 is increased. Then, as described above with reference to FIG. 6, when counter-electromotive voltage Vm of motor generator 29 exceeds system voltage VH, motor generator 20 generates braking torque Tm. As a result of this, driving torque Tep is caused to be substantially decreased by braking torque Tm generated by motor generator 20.

Therefore, when the accelerator is operated and the counter-electromotive torque (braking torque Tm) is generated in motor generator 20, it is necessary to increase target engine rotational speed Ne* from the set value determined by formula (5), so that counter-electromotive torque Tc of motor generator 10 is increased by a compensation torque (Tm×ρ) for canceling this braking torque Tm.

It should be noted that vehicle speed restriction SPmax may be imposed on vehicle speed SP in the fail-safe mode to control the engine rotational speed so that rotational speed Nm1 of motor generator 10 falls in the range defined by the above formula (1), regardless of accelerator operation amount Acc, for the region meeting SP>SPmax. At this time, vehicle speed restriction SPmax may be defined so that MG2 rotational speed Nm2 under vehicle speed restriction SPmax is lower than N2 shown in FIG. 4, to obtain counter-electromotive torque Tm=0 of motor generator 20 during the inverterless running.

Thus, during the inverterless running, HV-ECU 310 can set target engine rotational speed Ne* to cause driving torque Tep, which varies depending on accelerator operation amount Acc, to act on output shaft 60, while MG-ECU 320 sets inverters 221 and 222 in the shutdown state. Accordingly, the fail-safe running of vehicle 1 for the inverterless running is accomplished.

<Control of Inverterless Running when Malfunction in Communication Occurs>

The inverterless running is applied not only to the vehicle in which the control system for motor generators 10 and 20 fails, but also to the vehicle in which a malfunction occurs in communication between HV-ECU 310 and MG-ECU 320. This is because it becomes impossible to control motor generators 10 and 20 by transmitting to MG-ECU 320 an operation command based on driver's operation. Meanwhile, when communication between HV-ECU 310 and engine ECU 330 is normally performed, the inverterless running can be performed by controlling engine 100.

However, during the inverterless running resulting from the malfunction in communication, information (data) cannot be communicated between HV-ECU 310 and MG-ECU 320. It is therefore impossible for HV-ECU 310 to receive, from MG-ECU 320, information (data) about the operating state of the electrical system. As a result of this, HV-ECU 310 cannot directly acquire respective detection values of MG1 rotational speed Nm1, MG2 rotational speed Nm2, and system voltage VH. Meanwhile, HV-ECU 310 is able to obtain respective sensor values of vehicle speed SP and engine rotational speed Ne as detection values concerning the running state of the vehicle. Therefore, MG2 rotational speed Nm2 can be calculated from vehicle speed SP, and MG1 rotational speed Nm1 can also be calculated in accordance with the formula (4). Accordingly, even when a malfunction occurs in communication between HV-ECU 310 and MG-ECU 320, HV-ECU 310 can still estimate counter-electromotive voltages Vc and Vm based on the characteristics shown in FIG. 6. However, it is impossible for HV-ECU 310 to acquire system voltage VH when a malfunction occurs in communication with MG-ECU 320.

As set forth above, counter-electromotive torque Tc which acts as driving torque Tep is not determined by counter-electromotive voltage Vc only, but determined by voltage difference ΔV between counter-electromotive voltage Vc and system voltage VH (ΔV=Vc−VH). However, during the inverterless running resulting from the malfunction in communication, target system voltage VH* cannot be transmitted from HV-ECU 310 to MG-ECU 320.

It should be noted that, in each of HV-ECU 310 and MG-ECU 320, predetermined voltage V1 may be stored in advance as a target system voltage during the inverterless running resulting from the malfunction in communication, to allow the vehicle to run in the inverterless running mode. However, when the malfunction occurs in communication between HV-ECU 310 and MG-ECU 320 as described above, HV-ECU 310 is unable to determine whether converter 210 controls system voltage VH so that system voltage VH is equal to predetermined voltage V1.

In contrast, even when control of the engine rotational speed by HV-ECU 310 is performed normally, driving torque Tep may become excessive (when VH<V1 holds) or insufficient (when VH>V1 holds) unless system voltage VH is controlled to be equal to predetermined voltage V1. During the inverterless running resulting from the malfunction in communication between HV-ECU 310 and MG-ECU 320, HV-ECU 310 is unable to recognize abnormality of driving torque Tep caused by failure to control system voltage VH to be equal to V1. Namely, there is a possibility that the inverterless running is continued even when driving torque Tep has an abnormal value.

In view of the above, in connection with the embodiments described above, a description will be given of a control process for the fail-safe mode running when a malfunction in communication occurs, in order to detect abnormality of the driving torque, even under the above-described situation.

Figure 7:
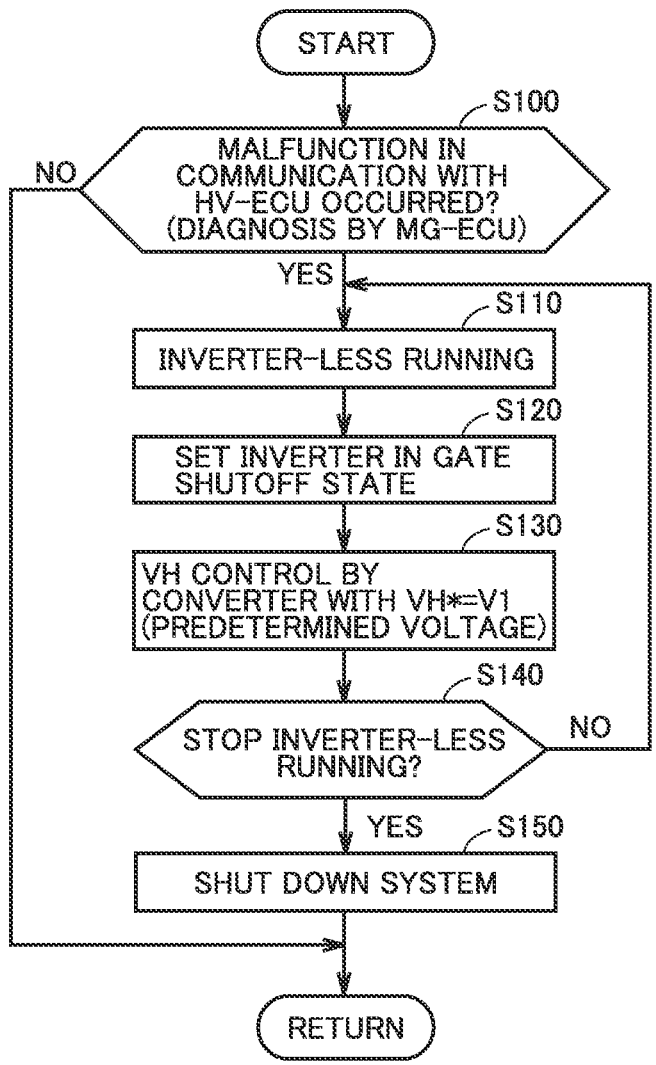
FIG. 7 is a flowchart illustrating a control process for fail-safe mode running by an MG-ECU when a malfunction in communication between an HV-ECU and the MG-ECU occurs in the hybrid vehicle in one or more embodiments.
Figure 8:
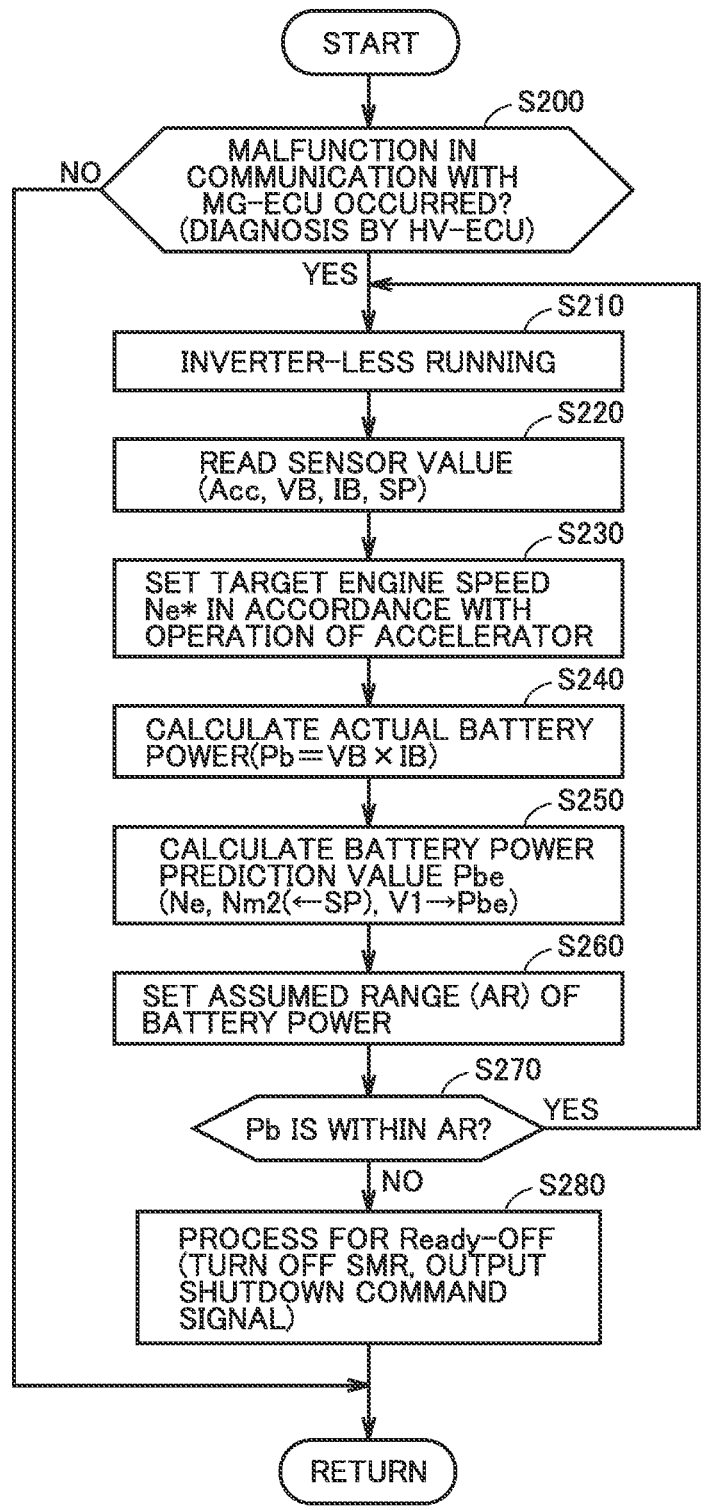
FIG. 8 is a flowchart illustrating a control process for fail-safe mode running by the HV-ECU when a malfunction in communication between the HV-ECU and the MG-ECU occurs in the hybrid vehicle in one or more embodiments.

FIGS. 7 and 8 are flowcharts illustrating respective control processes for the fail-safe mode running that are performed by MG-ECU 320 and HV-ECU 310, respectively, when a malfunction occurs in communication between HV-ECU 310 and MG-ECU 320 in the hybrid vehicle. When this malfunction occurs, the communication between HV-ECU 310 and engine ECU 330 is performed normally. The control processes following respective flowcharts in FIGS. 7 and 8 are performed repeatedly by MG-ECU 320 and HV-ECU 310, respectively.

Referring to FIG. 7, in step S100, MG-ECU 320 determines whether or not a malfunction in communication with HV-ECU 310 occurs. The determination in step S100 is made through a diagnosis (fault diagnosis) by MG-ECU 320. Namely, the determination in step S100 is not made based on information from HV-ECU 310, but made by MG-ECU 320 alone. When there is no occurrence of a malfunction in communication with HV-ECU 310 (NO in S100), MG-ECU 320 ends the process in the current cycle, without performing step S110 and subsequent steps.

When there is an occurrence of a malfunction in communication with HV-ECU 310 (YES in S100), MG-ECU 320 proceeds to step S110 to perform inverterless running. Thus, even when MG-ECU 320 cannot receive a command (typically gate shutoff command) from HV-ECU 310 due to a malfunction in communication, MG-ECU 320 can start the inverterless running.

During the inverterless running, MG-ECU 320 controls, in step S120, inverters 221 and 222 so that inverters 221 and 222 are in a gate shutoff state. Namely, MG-ECU 320 outputs gate shutoff signals SDN1 and SDN2 to inverters 221 and 222, respectively.

During the inverterless running, MG-ECU 320 sets, in step S130, target system voltage VH* for converter 210 to predetermined voltage V1 (VH*=V1). During the inverterless running resulting from a malfunction in communication, target system voltage VH* is not transmitted from HV-ECU 310. Therefore, converter 210 controls system voltage VH in accordance with predetermined voltage V1 stored in advance. As described above, a lower system voltage VH is advantageous for ensuring counter-electromotive torque Tc during the inverterless running. Therefore, predetermined voltage V1 may be set somewhat higher than an output voltage (rated voltage) of battery 150.

Further, in step S140, MG-ECU 320 determines whether or not the inverterless running is stopped by HV-ECU 310. As described above, even during the inverterless running resulting from a malfunction in communication, MG-ECU 320 can still receive a shutdown command signal for the electrical system, from HV-ECU 310 through signal line 315 (FIG. 2). Therefore, in step S140, MG-ECU 320 may detect stoppage of the inverterless running, upon receiving the shutdown command signal, namely determine that the inverterless running is stopped by HV-ECU 310. It should be noted that the determination in step S140 may be made in any manner as long as the fact that the inverterless running is stopped by HV-ECU 310 can be detected. For example, when communication between MG-ECU 320 and engine ECU 330 is normally performed, MG-ECU 320 may determine in step S140 that the inverterless running is stopped by HV-ECU 310, in response to information which indicates that the inverterless running has been stopped and which is transmitted from HV-ECU 310 to MG-ECU 320 through engine ECU 330.

When MG-ECU 320 does not detect stoppage of the inverterless running (NO in S140), MG-ECU 320 returns to step S110 to continue the inverterless running.

On the contrary, when MG-ECU 320 detects stoppage of the inverterless running (YES in S140), MG-ECU 320 causes the electrical system shown in FIG. 2 to be shut down, by setting converter 210 also in the gate shutoff state.

Referring to FIG. 8, in step S200, HV-ECU 310 determines whether or not a malfunction in communication with MG-ECU 320 occurs. The determination in step S200 is made through a diagnosis (fault diagnosis) by HV-ECU 310. Namely, the determination in step S200 is not made based on information from MG-ECU 320, but made by HV-ECU 310 alone.

When there is an occurrence of a malfunction in communication with MG-ECU 320 (YES in S200), HV-ECU 310 proceeds to step S210 to perform inverterless running. Thus, even when HV-ECU 310 cannot receive information from MG-ECU 320 due to a malfunction in communication, HV-ECU 310 can start the inverterless running.

On the contrary, when there is no occurrence of a malfunction in communication with MG-ECU 320 (NO in S200), HV-ECU 310 ends the process in the current cycle, without performing step S210 and subsequent steps.

During the inverterless running, HV-ECU 310 reads, in step S220, each data value which has been input to HV-ECU 310. For example, as shown in FIG. 2, HV-ECU 310 acquires accelerator operation amount Acc, brake operation amount Brk, vehicle speed SP, battery voltage VB, and battery current IB, and the like. Moreover, HV-ECU 310 also acquires, in step S220, engine rotational speed Ne transmitted from engine ECU 330. In step S220, HV-ECU 310 cannot acquire data (VH, Nm1, Nm2, for example) which is required to be transmitted from MG-ECU 320.

HV-ECU 310 performs, in step S230, control of the engine rotational speed in order to ensure that driving torque Tep is applied in accordance with driver's operation of the accelerator. Specifically, based on the aforementioned formulas (3) to (5) for example, target engine rotational speed Ne* is set in accordance with accelerator operation amount Acc.

In order to calculate Ne1 based on formula (4), system voltage and rotational speed Nm2 of motor generator 20 are necessary. However, during the inverterless running resulting from a malfunction in communication with MG-ECU 320, respective detection values of system voltage VH and rotational speed Nm2 cannot be obtained directly from MG-ECU 320. As to Nm2, HV-ECU 310 can calculate Nm2 from vehicle speed SP detected by vehicle speed sensor 513. Further, as to system voltage VH, predetermined voltage V1 is shared by and stored in MG-ECU 320 and HV-ECU 310. Thus, even when there is a malfunction in communication with MG-ECU 320, HV-ECU 310 can calculate, in step S230, target engine rotational speed Ne* by substituting VH=V1 into formula (4).

HV-ECU 310 calculates, in step S240, the actual value of the input/output power (actual battery power) Pb of battery 150, by determining the product of battery voltage VB and battery current IB. Since battery current IB has a positive value (IB>0) when the battery discharges and has a negative value (IB<0) when the battery is charged, the input/output power of battery 150 is also represented by a positive value when the battery discharges, and by a negative value when the battery is charged.

Further, HV-ECU 310 calculates, in step S250, a predicted value Pbe of the input/output power of battery 150 in the current running state (inverterless running) of the vehicle (the predicted value is hereinafter also referred to as predicted battery power Pbe). Calculation of predicted battery power Pbe needs to be performed using data that can be acquired even when there is a malfunction in communication with MG-ECU 320.

Figure 9:
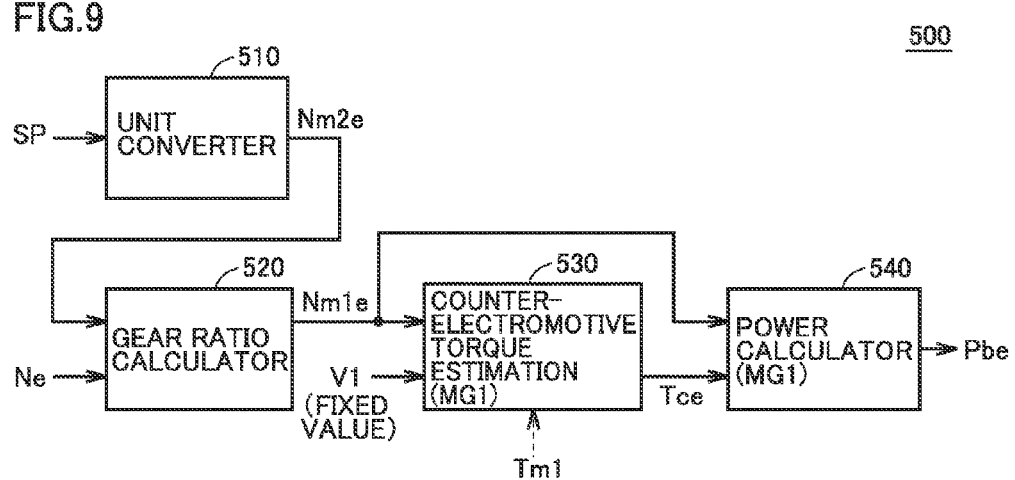
FIG. 9 is a block diagram illustrating a configuration for calculating a predicted power of a battery.

FIG. 9 shows a block diagram illustrating a configuration for calculating the predicted battery power. The function of each block in the block diagrams including FIG. 9 is achievable by a software process implemented by execution of a predetermined program by HV-ECU 310 and/or a hardware process implemented by an internal dedicated electronic circuit.

Referring to FIG. 9, a battery power prediction unit 500 includes a unit converter 510, a gear ratio calculator 520, a counter-electromotive torque estimation unit 530, and a power calculator 540.

Unit converter 510 calculates an estimate value Nm2e of the MG2 rotational speed (hereinafter also referred to as estimated MG2 rotational speed Nm2e) by multiplying vehicle speed SP obtained from the detection value of vehicle speed sensor 513 in step S220, by a predetermined proportionality constant.

Gear ratio calculator 520 calculates an estimate value Nm1e of the MG1 rotational speed (hereinafter also referred to as estimated MG1 rotational speed Nm1e) by substituting, into the formula (2), engine rotational speed Ne obtained from engine ECU 330 in step S220 and estimated MG2 rotational speed Nm2e calculated by unit converter 510.

Counter-electromotive torque estimation unit 530 calculates an estimate value of counter-electromotive torque Tc (hereinafter also referred to as estimated counter-electromotive torque value Tce) in accordance with the characteristics shown in FIG. 4, using estimated MG1 rotational speed Nm1e calculated by gear ratio calculator 520 and predetermined voltage V1. For example, a map for determining counter-electromotive torque Tc for MG1 rotational speed Nm1 under the condition VH=V1 of the characteristics in FIG. 4 may be prepared based on the results of experiments on any actual machine or the results of simulation. In this way, the function of counter-electromotive torque estimation unit 530 can be achieved.

Power calculator 540 calculates the electric power generated by motor generator 10, by determining the product of estimated counter-electromotive torque value Tce calculated by counter-electromotive torque estimation unit 530, and estimated MG1 rotational speed Nm1e calculated by gear ratio calculator 520. Based on this calculated electric power, predicted battery power Pbe is calculated. For example, a loss such as power loss in the path from motor generator 10 to battery 150 may be subtracted from the electric power generated by motor generator 10, to calculate predicted battery power Pbe.

Referring again to FIG. 8, after calculating predicted battery power Pbe (S250), HV-ECU 310 sets assumed range AR of the battery power in step S260.

Figure 10:
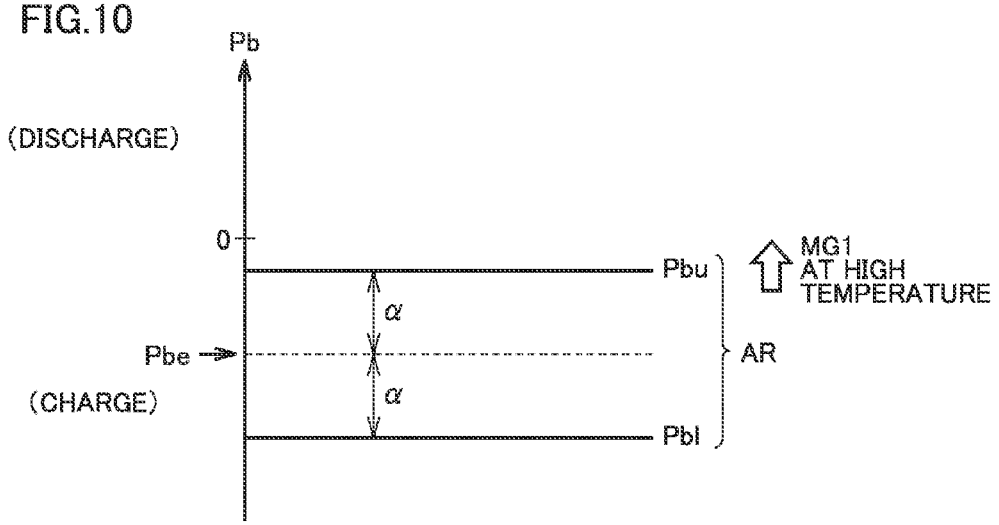
FIG. 10 is a conceptual diagram illustrating a way to set an assumed range of the battery power.

FIG. 10 is a conceptual diagram illustrating a way to set an assumed range of the battery power.

Referring to FIG. 10, assumed range AR of the battery power is set as a power range including predicted battery power Pbe. For example, assumed range AR of the battery power is set to include a predetermined margin with respect to predicted battery power Pbe. At this time, upper limit Pbu and lower limit Pbl of assumed range AR of the battery power are expressed respectively as Pbu=Pbe+α and Pbl=Pbe−α.

Referring again to FIG. 8, HV-ECU 310 determines, in step S270, whether or not actual battery power Pb (S240) falls in assumed range AR of the battery power.

When Pb<Pbl or Pb>Pbu is met, actual battery power Pb is out of assumed range AR of the battery power (NO in S270), and therefore HV-ECU 310 proceeds to step S280. In step S280, HV-ECU 310 performs a process for shifting vehicle 1 to a Ready-OFF state. Accordingly, SMR 160 (FIG. 1) is turned off to stop running (inverterless running) of vehicle 1. Further, in step S280, signal line 315 (FIG. 2) is used to output a shutdown command signal from HV-ECU 310 to MG-ECU 320.

In contrast, when Pbl<Pb<Pbu is met, actual battery power Pb falls in assumed range AR of the battery power (YES in S270). HV-ECU 310 therefore returns to step S210. Thus, while actual battery power Pb falls in assumed range AR of the battery power, respective operations in steps S210 to S270 can be performed repeatedly to continue the batteryless running.

As seen from the above, when a malfunction occurs in communication between HV-ECU 310 and MG-ECU 320, the control process for the inverterless running allows HV-ECU 310 and MG-ECU 320 to independently start a process for the inverterless running. In particular, a predetermined value of the system voltage (VH=V1) which is applied at the time of occurrence of the malfunction is shared in advance by these ECUs. Accordingly, even when communication between HV-ECU 310 and MG-ECU 320 is impossible, vehicle 1 can be caused to run in the fail-safe mode by driving torque Tep which is determined in accordance with driver's operation of the accelerator.

Further, during the inverterless running, a comparison can be made between actual battery power Pb and assumed battery power range AR including predicted battery power Pbe which is a battery power when the driving torque of vehicle 1 is obtained as intended, to stop the vehicle from running upon occurrence of abnormality of driving torque Tep. In this way, during the inverterless running, the actual power of battery 150 can be monitored for each control cycle to indirectly detect whether abnormality of the driving torque occurs or not.

<Modification for Adaptation to Increase in Motor Generator Temperature>

Generally, during the inverterless running, vehicle 1 is stopped from running when motor generator 10 becomes excessively heated due to rotation. For example, when motor temperature Tm1 detected by temperature sensor 251 increases to become higher than upper limit temperature T1, the inverterless running can be stopped.

Even when motor temperature Tm1 is lower than upper limit temperature T1, due to an influence of decrease of the magnetic force of the permanent magnet caused by increase of the temperature, proportionality constant Kc representing the gradient of straight line k1 shown in FIG. 6 may be decreased to reduce counter-electromotive voltage Vc. When such reduction of counter-electromotive voltage Vc occurs due to increase of the temperature, driving torque Tep is decreased to become lower than an intended torque, even if system voltage VH is controlled normally (VH=V1).

Therefore, for proportionality constant Kc used by formula (4) and counter-electromotive torque estimation unit 530 (FIG. 9), a map can be generated in advance, reflecting the change caused by increase of motor temperature Tm1. For example, a map may be adapted to magnetic characteristics of permanent magnet 15 in motor generator 10, by generating the map in which proportionality constant Kc is set to constant value K0 for motor temperature Tm1 in a temperature range of predetermined temperature T2 or less (Tm1≤T2) (the temperature is not increased), while proportionality constant Kc is set smaller than K0 for a temperature range of Tm1>T2 (the temperature is increased). In this case, as indicated by the dotted line in FIG. 9, motor temperature Tm1 is additionally used for calculation by counter-electromotive torque estimation unit 530.

As a result of this, when the temperature is increased (T2<Tm1<T1), predicted battery power Pbe is set higher than predicted battery power Pbe when the temperature is not increased (Tm1≤T2), for the same value of estimated MG1 rotational speed Nm1e. Accordingly, when the temperature is increased (T2<Tm1<T1), upper limit Pbu of assumed range AR of the batter power is also set higher (namely in the direction to increase battery discharge power) than upper limit Pbu when the temperature is not increased (Tm1≤T2). It should be noted that upper limit Pbu of assumed range AR of the battery power can be defined, not only by generating the map as described above, but also by increasing the margin (+α) in setting assumed range AR of the battery power, with increase of motor temperature Tm1.

In this way, the upper limit of assumed range AR of the battery power, which corresponds to a normal range of the driving torque, can be adapted to the phenomenon that counter-electromotive voltage Vc and counter-electromotive torque Tc decrease with increase of the magnet temperature, by shifting the upper limit in the direction in which the charging power decreases. Accordingly, it is possible to prevent the vehicle from being unable to continue the fail-safe running (inverterless running) when abnormality of driving torque Tep is detected in spite of the fact that system voltage VH is normally controlled.

It should be noted that in a modification adapted to such temperature increase, HV-ECU 310 may be configured to be capable of detecting information about the motor temperature even when a malfunction in communication occurs. However, when the malfunction in communication occurs, the value of motor temperature Tm detected by temperature sensor 251 cannot be input to HV-ECU 310 through MG-ECU 320, unlike the condition when no malfunction in communication occurs.

Therefore, in this modification, in order for HV-ECU 310 to be capable of directly detecting increase of the motor temperature, the values detected by temperature sensors 251 and 252 may also be input directly to HV-ECU 310. Alternatively, a signal indicating occurrence of temperature increase (Tm1>T2) may be input from MG-ECU 320 to HV-ECU 310 through a signal line of the same kind as signal line 315 (FIG. 2) for the shutdown command signal.

<Modification for Calculation of Predicted Battery Power>

As described above, vehicle speed restriction SPmax for the inverterless running can be designed so that Nm2<N2 is satisfied under the condition SP=Smax to estimate predicted battery power Pbe from only the counter-electromotive torque Tc of motor generator 10 as shown in FIG. 9. In contrast, if such a design cannot be made or a malfunction in communication occurs under the condition SP>Smax, predicted battery power Pbe may be calculated by additionally taking into consideration counter-electromotive torque Tin of motor generator 20.

Figure 11:
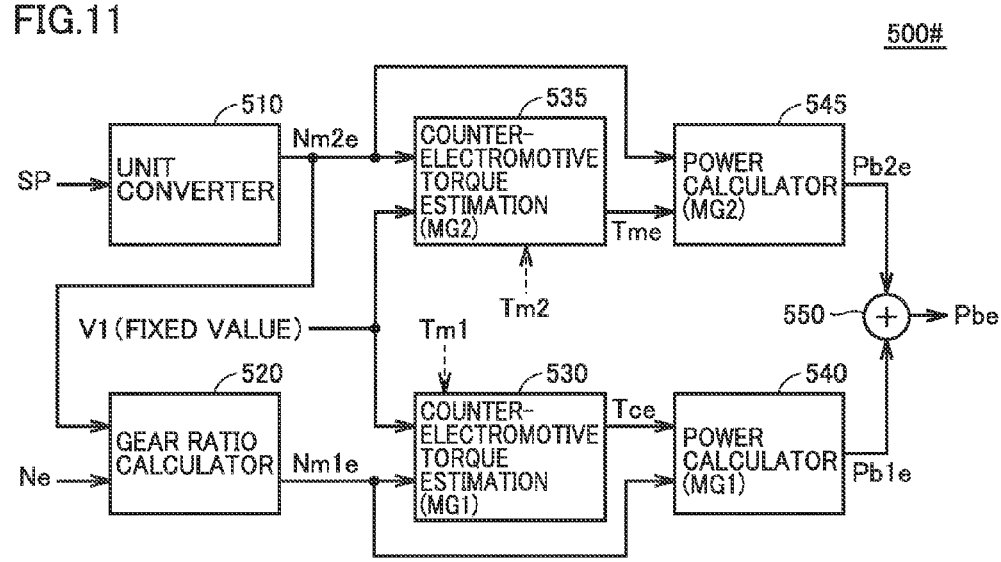
FIG. 11 is a block diagram illustrating a modification of the configuration for calculating a predicted power of the battery.

FIG. 11 is a block diagram illustrating a modification of the configuration for calculating the predicted battery power.

Referring to FIG. 11, a battery power prediction unit 500# includes a unit converter 510, a gear ratio calculator 520, and a counter-electromotive torque estimation unit 530 similar to those in FIG. 9, and additionally includes a counter-electromotive torque estimation unit 535, a power calculator 545, and an adder 550.

Counter-electromotive torque estimation unit 535 calculates an estimate value of counter-electromotive torque Tm (hereinafter also referred to as estimated counter-electromotive torque value Tme) using estimated MG2 rotational speed Nm2e calculated by unit converter 510 and predetermined voltage V1. For example, for motor generator 20, a map for determining counter-electromotive torque Tm for MG2 rotational speed Nm2 under the condition VH=V1 can be generated in advance based on the results of experiments on any actual machine or the results of simulation, so as to implement the function of counter-electromotive torque estimation unit 535.

Based on the product of estimated counter-electromotive torque value Tme calculated by counter-electromotive torque estimation unit 535 and estimated MG2 rotational speed Nm2e calculated by unit converter 510, power calculator 545 calculates the electric power generated by motor generator 20. Based on the calculated electric power, predicted battery power Pb2e generated by the counter-electromotive torque of motor generator 20 is calculated.

Meanwhile, power calculator 540 calculates predicted battery power Pb1e generated by the counter-electromotive torque of motor generator 10. Predicted battery power Pb1e calculated by power calculator 540 is comparable to predicted battery power Pbe in FIG. 9.

Adder 550 calculates predicted battery power Pbe based on the sum of predicted battery power Pb1e calculated by power calculator 540 and predicted battery power Pb2e calculated by power calculator 545. In this way, predicted battery power Pb2e generated by the counter-electromotive torque of motor generator 20 can be added to predicted battery power Pbe in FIG. 9, to thereby calculate predicted battery power Pbe.

Thus, even when the vehicle is running in the state (Tm>0) in which counter-electromotive torque Tm is generated in motor generator 20, assumed range AR of the battery power can be set appropriately. As a result of this, it is possible to enhance the precision with which abnormality of driving torque Tep is indirectly detected through monitoring of actual battery power Pb. Moreover, in the configuration of FIG. 11, counter-electromotive torque estimation units 530 and 535 can calculate respective estimated counter-electromotive torque values Tce and Tme, using motor temperatures Tm1 and Tm2 and reflecting decrease of the magnetic force due to increase of the magnet temperature.

Although embodiments have been described and illustrated in detail, it is clearly understood that the same is by way of illustration and example only and is not to be taken by way of limitation, the scope of the claimed subject matter being interpreted by the terms of the appended claims.

What is claimed is:

1. A hybrid vehicle comprising:
an engine;
a first rotating electric machine including a first rotor equipped with a permanent magnet;
an output shaft coupled to drive wheels;
a planetary gear device mechanically coupled to the engine, the first rotor, and the output shaft, and configured to transmit a torque between the first rotating electric machine, the engine, and the output shaft;
a second rotating electric machine including a second rotor coupled to the output shaft;
a power storage device configured to be rechargeable;
a monitoring unit configured to detect a voltage and a current of the power storage device;
a converter configured to perform a bidirectional DC voltage conversion between the power storage device and an electric power line;
a first inverter connected between the electric power line and the first rotating electric machine;
a second inverter connected between the electric power line and the second rotating electric machine;
a first controller configured to control an operation of the engine; and
a second controller configured to control the first rotating electric machine and the second rotating electric machine through the first inverter and the second inverter, and to control a voltage on the electric power line through the converter,
the hybrid vehicle including a fail-safe running mode to perform inverterless running in which each of the first inverter and the second inverter is set in a gate shutoff state, the engine is controlled to mechanically rotate the first rotating electric machine with a braking torque generated by electric power generation, and the hybrid vehicle is caused to run by a torque acting on the output shaft as a counterforce of the braking torque,
in each of the first inverter and the second inverter in the gate shutoff state, each switching element being kept in an OFF state and a diode connected in anti-parallel with the switching element forming a current path,
when detecting a malfunction in communication with the second controller, the first controller controlling a rotational speed of the engine so that the inverterless running is performed,
when detecting a malfunction in communication with the first controller, the second controller setting each of the first inverter and the second inverter in the gate shutoff state and controlling an operation of the converter to control the voltage on the electric power line so that the voltage is equal to a predetermined first voltage, so as to cause the inverterless running to be performed, the first controller stopping the hybrid vehicle from running when an actual electric power calculated from the voltage and the current of the power storage device is out of an assumed electric power range during the inverterless running, the assumed electric power range being set as an electric power range including a predicted input-output electric power of the power storage device, and the predicted input-output electric power being determined from the first voltage, a rotational speed of the second rotating electric machine converted from a detected value of a vehicle speed, a detected value of the rotational speed of the engine, and a gear ratio of the planetary gear device.

2. The hybrid vehicle according to claim 1, wherein the first controller is configured to be capable of detecting information about a temperature of the first rotating electric machine while malfunction occurs in communication between the first controller and the second controller, and when the temperature of the first rotating electric machine is not lower than a predetermined temperature, an upper limit of the assumed electric power range is set to cause charging electric power of the power storage device to decrease, relative to the upper limit of the assumed electric power range when the temperature of the first rotating electric machine is lower than the predetermined temperature.

* * * * *